Jan. 8, 1946.  L. E. SODERQUIST  2,392,619
CONTROL APPARATUS FOR VULCANIZING PRESSES
Filed May 22, 1942  5 Sheets-Sheet 1

Fig.-1

INVENTOR
LESLIE E. SODERQUIST
BY
ATTORNEYS

Jan. 8, 1946. L. E. SODERQUIST 2,392,619
CONTROL APPARATUS FOR VULCANIZING PRESSES
Filed May 22, 1942 5 Sheets-Sheet 4

INVENTOR
LESLIE E. SODERQUIST

ATTORNEYS

Jan. 8, 1946.   L. E. SODERQUIST   2,392,619
CONTROL APPARATUS FOR VULCANIZING PRESSES
Filed May 22, 1942   5 Sheets-Sheet 5

INVENTOR
LESLIE E. SODERQUIST

BY

ATTORNEYS

Patented Jan. 8, 1946

2,392,619

UNITED STATES PATENT OFFICE 2,392,619

CONTROL APPARATUS FOR VULCANIZING PRESSES

Leslie E. Soderquist, Akron, Ohio, assignor to The McNeil Machine & Engineering Company, Akron, Ohio, a corporation of Ohio Application May 22, 1942, Serial No. 444,136

25 Claims. (Cl. 18—17)

The present invention relates to means for controlling the operation of presses and particularly presses which are designed and intended for the vulcanization of tires or other articles which are subjected to internal pressure during the treatment while the press is closed. Although the invention is shown as applied to presses for the vulcanization of pneumatic tires, the principles of the invention may be applied to wider fields and may be employed in the vulcanization of all articles which are subjected to internal pressure during vulcanization or while the press is closed. It is also illustrated as applied to a particular type of press in which the upper half of the mold is moved during opening in a peculiar and distinctive fashion which gives to the press a self-stripping action. However, the invention is not restricted to self-stripping tire presses, but may be applied and adapted with equally advantages results to all types of presses and to presses which open by movement of either or both halves of the mold.

It is well known that in the operation of presses in which the article is subjected to internal pressure while the press is closed, if the pressure is not relieved substantially before the press is permitted to open fully, the expansive force of the entrapped pressure medium will disrupt the article contained therein, and if the pressure fluid is, as is often the case, superheated water under pressure, bursting of the air bag or the article will sometimes result in serious injury to the workmen.

Devices have been proposed heretofore with the object of preventing all opening of the press, if the residual pressure is entrapped in the interrior of the article, usually in the so-called air bag on which a pneumatic tire is cured. As all modern presses are equipped with timing mechanisms which will normally open the press when the curing cycle has been completed, such a device, to be useful, should be reliable and effective under any conditions. The former schemes provided a branch line or branch lines from the main line which supplies pressure fluid to the air bag, and at the terminus of each branch line there is provided a pressure responsive device which will prevent and inhibit all opening movement of the press in the presence of pressure in the branch line. This type of mechanism does not meet the conditions encountered in tire factories as the so-called pressure responsive devices are not responsive to the pressure within the tire, air bag, or other article within the mold. In cases where the pressure is trapped within the air bag, for example, due to a stoppage at the inlet to the bag, the device is wholly inoperative on the non-circulating type of pressure supply. Even with a circulating type of pressure supply where the hot water under pressure enters the bag at one stem and leaves at another, the device is not dependable, for the pressure may fall in the pressure responsive devices without a corresponding fall in the pressure within the article or the air bag. As the entrapment of pressure within the bag is almost universally caused by the lodging of flakes of rubber from the inner wall of the bag in the stem of the bag, these devices are actually very dangerous as they do not always perform the functions ascribed to them and are unreliable.

The present invention provides a means of controlling the opening movement of the press which is directly actuated and operated by the pressure within the article itself and not controlled or operated by the pressure within a device remote from the article. In this respect the device is basically like the mechanism shown and described in my former Patent No. 2,242,795, issued May 20, 1941. Like the device of my former patent, the control mechanism shown herein is reliably operative with either circulating or non-circulating types of pressure systems.

It will also be noted that the system of press control which is shown and described herein does not act to inhibit or prevent the opening movement of the press, but to stop the opening movement of the press after the press has opened to an extent insufficient to create a hazardous condition. Indeed the device shown herein is dependent for its operability upon the initial opening of the press, whether the pressure in the air bag has been released or not, for it relies for its operation upon the reaction of any residual pressure which may be within the article upon one section of the mold which is permitted to have a slight movement with respect to its support, and as the mold is not free to respond to the pressure unless the press is partially opened, it will be seen that an inhibition of opening movement in the presence of pressure within the bag would destroy the operativeness of the system of press control shown and described herein.

While the present system of press control embodies the broad principles of the mechanism of my prior patent referred to above, it is simpler than that shown in said patent and more readily adaptable to all types of presses. It is an absolute safeguard against any bursting of the air bag or other article within the mold due to entrapped pressure.

It will further be noted that in the event of stoppage of the press and subsequent relaxation of the pressure which may be due to a partial stoppage of the air bag outlet, the press will remain in its partially opened position and it will be necessary to operate manually the control switches before the press will open. This will prevent accidents which often occur with the systems devised prior to the advent of my press control systems in which a slow leakage might cause the press to open while dangerous pressures are retained in the air bag.

It will also be understood that the device is operative to prevent opening of the press only when the residual pressure within the article is sufficient to actuate the movable mold element. As pressures which are insufficient to move the mold are not great enough to cause any damage, the press will open even if there is some pressure within the article, whereas with systems prior to mine, the mold will remain closed and thus destroy articles by overcuring. By my systems many tires are saved which would be ruined by systems of press control which keep the mold closed at pressures below the danger point.

The invention is illustrated as applied to a press of the steam-box type in which the molds are enclosed within hollow casings in which steam is circulated for heating the molds. Obviously the steam pressure within the boxes will be relieved before the press opens, but sometimes it does not, due to accidental stoppage of the exhaust or for some other cause. In the event the surrounding steam pressure is not relieved, the improved safety device will function to arrest the press at its partially opened position and danger to the workmen from this cause will be prevented. This steam box arrangement is optional, however, as the device will operate satisfactorily with all types of presses.

In the drawings and description there is disclosed the best known and preferred form of the invention as it has been perfected, but it will be understood that changes and modifications may be made therein without departing from the principles of the invention as set forth in the appended claims. It will also be noted that in adapting the invention to other forms of presses, the invention may be altered and modified. There is also shown an especial form of mold mounting means for the upper half of the mold which is the subject of my Patent No. 2,358,762, granted September 19, 1944, but this is not required for the operativeness of the present invention.

It will be understood that, in common with all presses of this type, there is provided a timing mechanism which acts to open the valves for the admission and discharge of fluid under pressure to the interior of the article or the air bag and for actuating the press-operating means at the end of the prescribed vulcanizing period. As this device may be more or less standard, its details are not shown. It will be understood that the release of pressure takes place a sufficient interval prior to the opening movement to allow the pressure to escape under normal conditions. Nor are the control cams or other devices for moving the upper press platen shown except in so far as they are essential for a full understanding of the operation of the control mechanism.

In the drawings, the base of the press, which is illustrated as an example, is shown at 1, the lower or fixed mold section at 2 and the upper or movable mold section at 3. The tire is shown at 4 and the usual curing or air bag at 5, a stem through which pressure fluid is admitted to the bag being indicated at 6. The lower mold 2 is attached directly within and to the lower half of a steam box 8 which is, in turn, secured to the stationary platen of the press. The upper half of the mold 3 is secured to the underside of the movable platen 9, which, in the press design illustrated, is provided with a threaded hub or center 10 adjustably engaging the threaded center or support 12 depending from the interior of the upper steam box 14. This arrangement permits a rough adjustment for different thicknesses of mold sections as explained more in detail in my last referred to patent.

The steam boxes are insulated as shown at 15 and are provided at their mating edges with a sealing gasket 16. The upper steam box 14 is supported by bolts 20 which are guided, for the vertical movement required for operation of the safety device, in adjustable sleeves 21 which are threaded in housings 22 secured in the press crosshead 24. As explained in my last referred to patent, the sleeves 21 are rotated for fine adjustment of the mold by gears indicated at 26. The weight of the steam box 14 and its attached upper mold 3 is borne by nuts 28 threaded on the upper protruding ends of the bolts 20 and between each nut and sleeve 21 is located a loose washer 29. The crosshead 24 is, in the form of press illustrated herein, carried upon a link 30 pivoted at 31 in side links 32 constituting a toggle. The opening and closing of the press is through a connecting link 33 which is pivoted at pin 34 to the main operating gear 35 on shaft 36. This gear 35 is rotated in one direction by a power-shaft 37 driven by a motor 38 indicated as the "Press motor" in Fig. 10. The fully closed position of the press is illustrated in full lines in Fig. 1. When the motor is started to open the press, the large gear 35 will move in the direction of the arrow, and at the position shown in Figs. 2 and 3, the press will have been moved sufficiently so that the two mold sections will open to an extent sufficient to permit the safety mechanism to operate to arrest the opening movement in the event the pressure has not been reduced in the air bag to a point of safety. If the pressure in the air bag has been relieved so that the full opening of the press is permitted, the motor will rotate the gear 35 through the balance of the arcuate movement to the point at which the press is fully opened, as shown in dotted lines in Fig. 1. On the closing movement, the gear 35 completes the full 360° revolution and the press is returned to the condition shown in Fig. 1. Owing to the design of the press, the opening movement will require a rotation of the shaft 36 substantially greater than 180° as will be seen by comparing the positions of the pin 34 in the two positions shown in Fig. 1.

Figure 10:
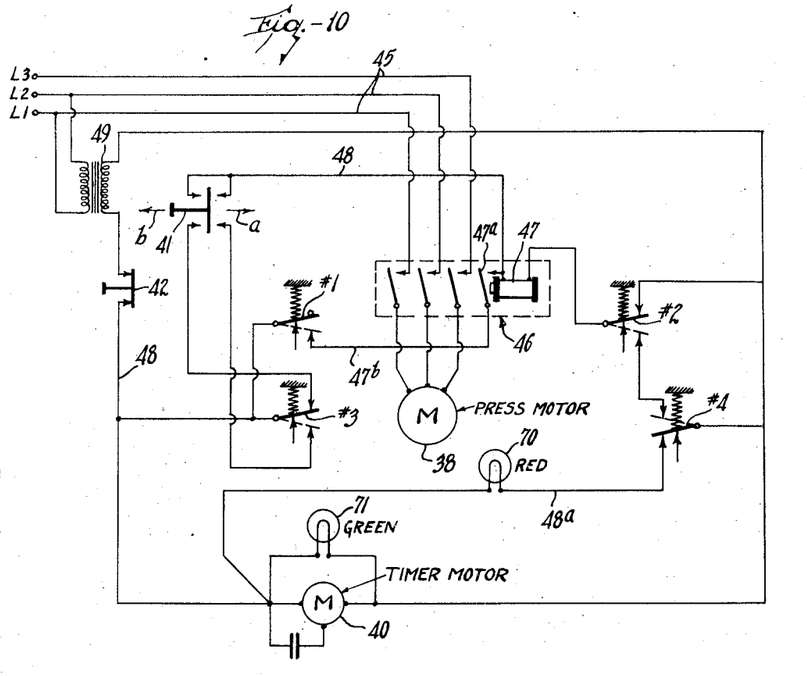
Fig. 10 is a wiring diagram for the electrical circuits.

Before entering into a detailed description of the safety mechanism, it will be noted that the timing mechanism is operated by a motor 40 designated as the "Timer motor" on Fig. 10. The starting button which energizes the motor to close the press is indicated at 41 and is manually moved momentarily in the direction of the arrow $a$ on Fig. 10 after the tire is laid in the mold and the connection made to the air bag for the fluid pressure. When the operator releases the starting button, it assumes the midway position shown in Fig. 10, the holding circuit, which will be later described, maintaining the current to the motor 38 until it is stopped by the limit switch at the closed position. To open the press the switch 41 is moved by the timer in the direction of the arrow $b$ for the instant that is required to start the motor for the opening movement. In the line is located the emergency switch 42 by which the motor 38 can be stopped at any time in the event of accident or the like. The power for operating the press is through the main lines 45 to the press-operating switch 46 which is thrown to closed position by the magnet 47 which is actuated by the line 48 from the starting button. The circuit 48 receives current from the main power lines through the transformer 49 and in this circuit is located the starting button switch 41, the emergency switch 42, the main power switch operating magnet 47, and the several switches #1, #2, #3 and #4 which control the press operation. Also, from this circuit is derived the power for the timer motor and the signal lamps. The armature 47ª for the magnet which throws the switches 46 is connected to one contact of the limit switch #1 by the line 47ᵇ. Fig. 10 shows the circuits as in the closed position of the press ready for the opening movement.

It will be observed that there are four switches in the circuits indicated by #1, #2, #3 and #4. Switch #1 is the limit switch which, when in the raised position shown, stops the motor at the end of the opening and closing movements. Switch #2 is in the holding circuit and is held in its raised position shown in Fig. 10 during the opening movement for a sufficient length of time to permit the limit switch #1 to drop and close the circuit to the motor. Switch #3 is the switch which sets the circuits for the push button switch 41 for either the opening or closing movement. Swith #4 is the safety switch, the operation and function of which will be described, it being sufficient to state at this point that when the press starts to open, the circuit to the magnet 47 is maintained through the switch #2 for a period sufficient to bring the press through its initial opening movement to the position shown in Figs. 2 and 3, whereupon the switch #2 drops to its lower position and the circuit is then through switch #2 and switch #4 which has, if the operation is normal, been raised. If, however, the operation is not normal so that pressure remains in the air bag or article, the switch #4 remains in its depressed position, the magnet is deenergized and the main line switch 46 opens to shut off the motor. In normal operations, with the switch #2 lowered and the switch #4 raised, the press will continue its operation until the limit switch #1 stops the press at the fully open or fully closed position.

Figure 8:
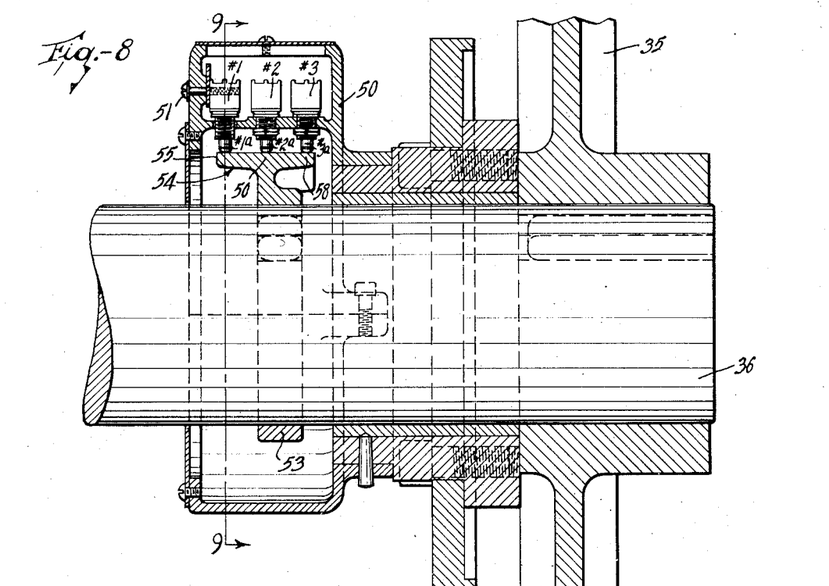
Fig. 8 is a section along the main press-operating shaft showing the control means for actuating the power circuits, the section being taken on the line 8—8 of Fig. 1.
Figure 9:
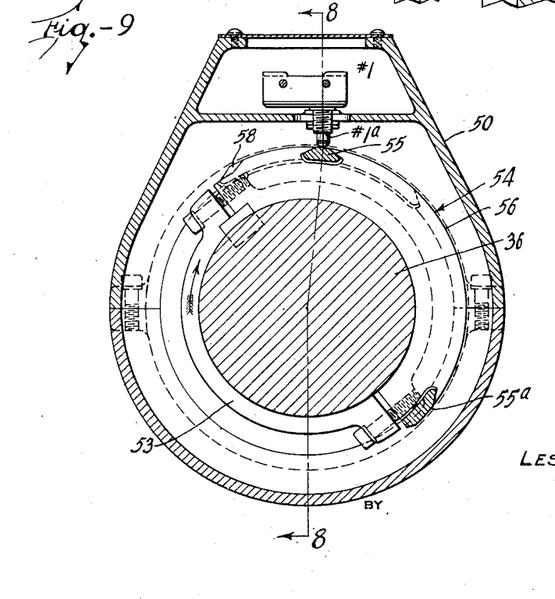
Fig. 9 is a section on the line 9—9 of Fig. 8.
Figure 11:
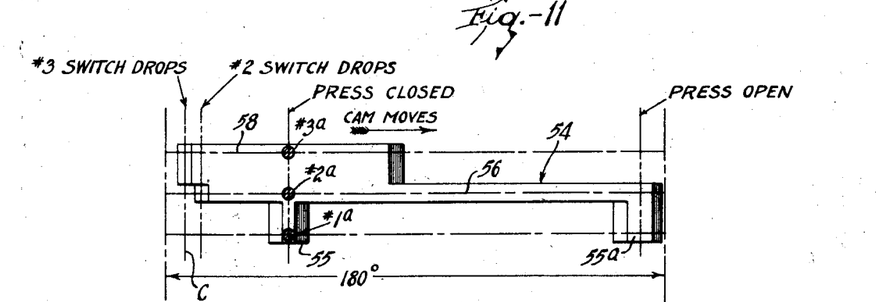
Fig. 11 is a detail projection of the control cam shown in Figs. 8 and 9.

The position of the switches #1, #2, and #3 on the press is shown in Fig. 8. These three switches are located in line in a housing 50 over the shaft 36, the switch #1 being bodily adjustable as shown at 51 so that it can be shifted about the shaft in order to be set accurately to stop the press at the proper points. These switches are actuated by pins #1ª, #2ª and #3ª, respectively, which are arranged to bear upon operating cam surfaces of the cam 54 which is carried by a cam wheel 53 secured to the shaft 36. The configuration of the cam 54 and its direction of movement is shown in Fig. 11.

The cam 54 is provided wth two short, raised portions 55 and 55ª which actuate the limit switch pin #1ª at the end of the closing and opening movement, respectively. The cam 54 also has a long raised portion 56 which holds the switch pin #2ª in its raised position during the whole of the closing movement, but which terminates at a point beyond or to the left in Fig. 11, this point corresponding approximately with the degree of arcuate movement of the shaft 36 which will bring the press to the position shown in Figs. 2 and 3. The press will drift of its momentum slightly beyond the point to approximately the line $c$ in Fig. 11. The cam also has an arcuate, raised portion 58 for the switch pin #3ª which, as shown in Fig. 10, supplies the current to either side of the switch 41 depending upon whether the next movement of the press is to be an opening or closing movement.

Figure 1:
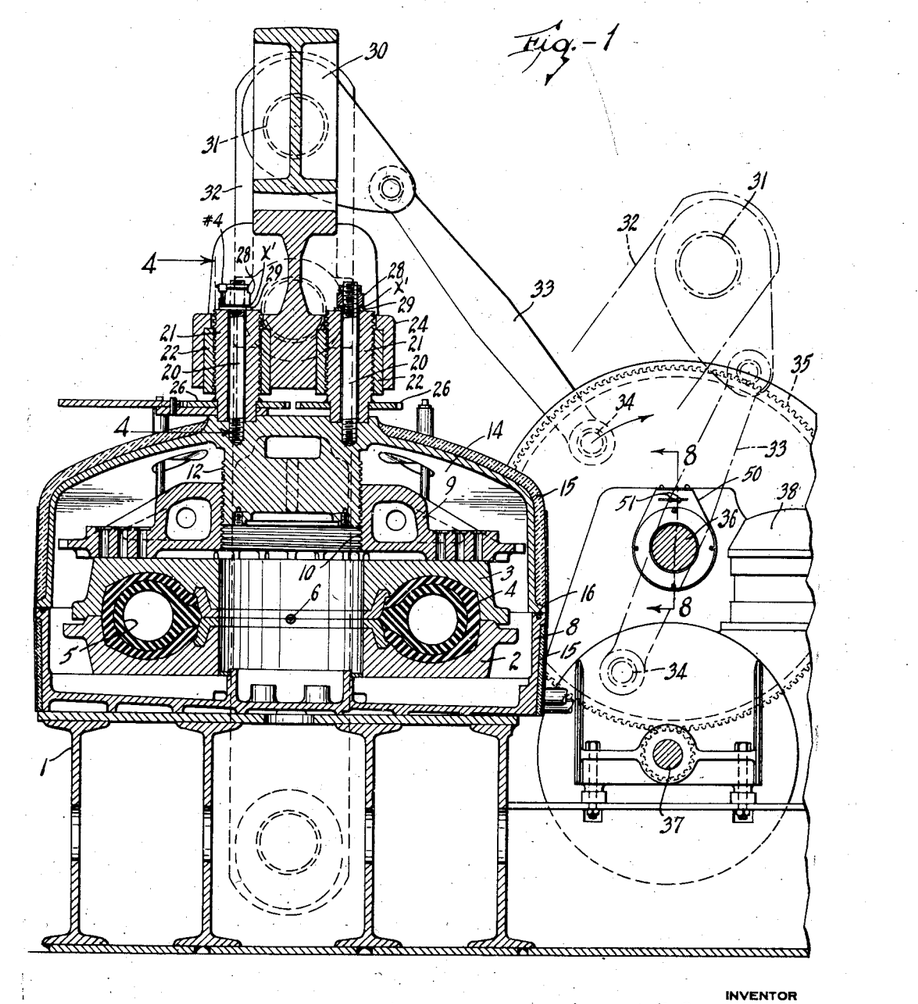
Fig. 1 is a vertical section through a press of the self-stripping type equipped with the control mechanism, this view showing in full lines the press closed as in the operation of vulcanizing a tire and in dotted lines the position of the press in fully opened position.

When the press is in the closed position shown in Fig. 1, the several pins #1ª, #2ª and #3ª are raised by the cam 54 and the several switches controlled thereby are in the position shown in Fig. 10. The curing period having elapsed, the timer mechanism kicks the switch 41 in the direction of the arrow $b$ and the press starts to open. The limit switch immediately falls, but the switch #2 remains in raised position until it passes off the cam surface 56. At this point unless the switch #4 is raised, the opening movement will stop. If the switch #4 is raised, however, the motor will continue to operate until the limit switch #1 is again raised by the cam surface 55ª. It will be observed that during the closing movement, the pin #2ª is raised so that the switch #2 is raised during this entire movement. In other words, the safety switch #4 is relied upon only during the opening cycle of the press from the point shown in Figs. 2 and 3 to the fully open position.

Figure 4:
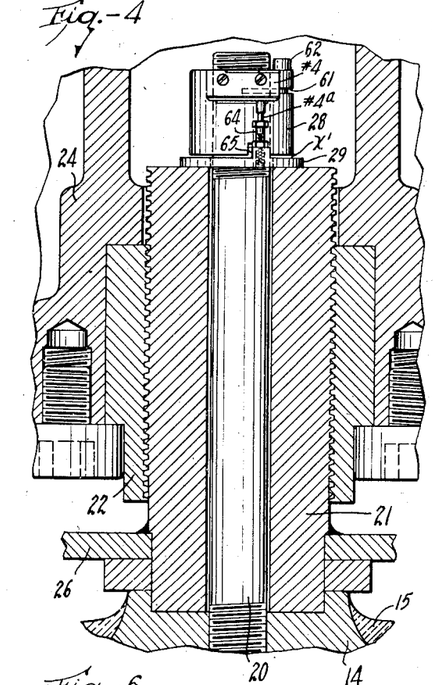
Fig. 4 is an enlarged cross-sectional view on the line 4—4 of Fig. 1 through the control device showing the position of the parts as in Figs. 1 and 3.
Figure 5:
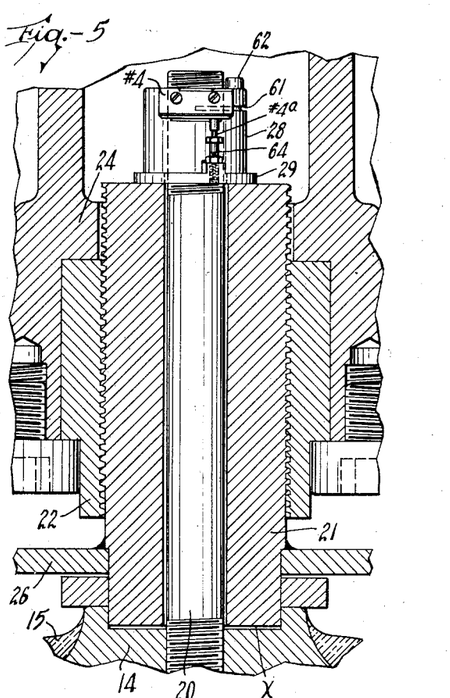
Fig. 5 is a similar view on the line 5—5 of Fig. 2 showing the parts in the position when the safety device is not in action.
Figure 6:
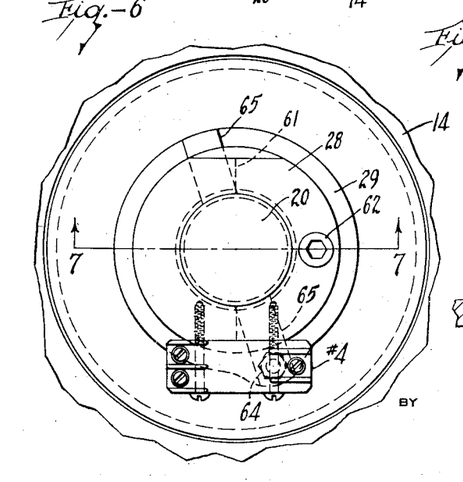
Fig. 6 is a view looking on the top of the parts shown in Figs. 4 and 5.
Figure 7:
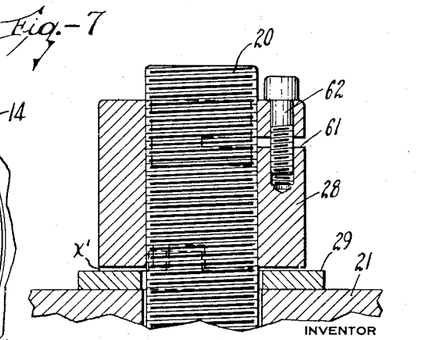
Fig. 7 is a section on the line 7—7 of Fig. 6.

Referring now more particularly to the safety control mechanism which centers about the operation of the switch #4:

The principle upon which the device operates may be briefly stated. It will be noted that there is provided between the crosshead 24 and the upper mold 3 a limited amount of play or lost motion, this being indicated by the spaces marked $x$ on Figs. 2 and 5 and by the spaces $x'$ in Figs. 1, 3 and 4. When the mold and its attached elements are suspended and hang of their own weight, this space will appear at $x$ between the sleeves 21 and the top of the steam box because the weight of the parts is supported on the nuts 28 which now bear on the top of the sleeve 21 through the intermediate washers 29. When, however, the press is closed, the weight of the upper mold and its attached parts is carried by the lower mold which brings the top of the steam box in contact with the bottom of the sleeves 21 and the space, due to the play or lost motion, is transferred to the position $x'$ so that there is now a gap between the underside of the nuts 28 and the washer 29. In the normal operation of the press, i. e., when the pressure is relieved from the air bag, as the press starts to open and as soon as the upper mold is no longer supported by the lower mold, the space is transferred from the position $x'$ to $x$. If, however, sufficient pressure is trapped in the air bag to create a hazardous condition, if the press should continue its opening movement, that degree of pressure is sufficient to support the weight of the mold and its attached parts and the expansion of the air bag will lift the mold so that the space is retained at the position $x'$. The area of the mold cavity is such that the aggregate pressure exerted by the bag when the pressure therein is below the danger point is insufficient to support the weight of the upper mold section and its attachments. However, a full exhaustion of the pressure in the bag is not required to insure the continued opening movement of the press, so that if there is some residual pressure in the bag, but not sufficient to create a hazard, the press will continue to open and a tire will not be ruined simply because the pressure was not wholly relieved. As explained above, this will save many tires from overcuring which would be ruined by pressure responsive mechanisms, such as devised prior to my inventions, which stop the press in the presence of any residual pressure in the line to the air bag.

The degree of lost motion permitted between the mold and the crosshead need be only sufficient to actuate the safety switch #4 and as in commercial installations there are employed what are known as "micro switches" for these safeties, the movement may be less than $\frac{1}{32}$ of an inch. In the drawings, the spaces $x$ and $x'$ have been greatly exaggerated in order that they may be seen. The extent of opening of the mold before the safety switch comes into action may be varied in accordance with requirements and is determined by the extent of the cam 56 to the left of the closed position as shown in Fig. 11. It may be opened even beyond the extent shown in Fig. 3, it being necessary only that the gap between the mold sections 2 and 3 is insufficient to allow the air bag to burst. It will be noted, however, that a substantial opening of the mold is necessary in order for the safety device to operate because it is dependent upon the shifting of the weight of the upper mold from the lower mold to its own supporting means.

In considering this device, the mold platen 9 and the steam box may be considered as one unit and the crosshead 24 and adjusting sleeve 21 may be considered as the other unit between which the lost motion takes place, so that when the "mold" is referred to in the claims and in the broader description, this term means either a mold per se or the mold and its attached elements and the term "crosshead" means any supporting means for the mold. It will also be noted that with mere mechanical modifications, the same safety mechanism will be adaptable to a press in which the upper half is stationary and the lower half is moved to open and close the mold, or in which both halves of the mold are moved.

Figures 2, 3:
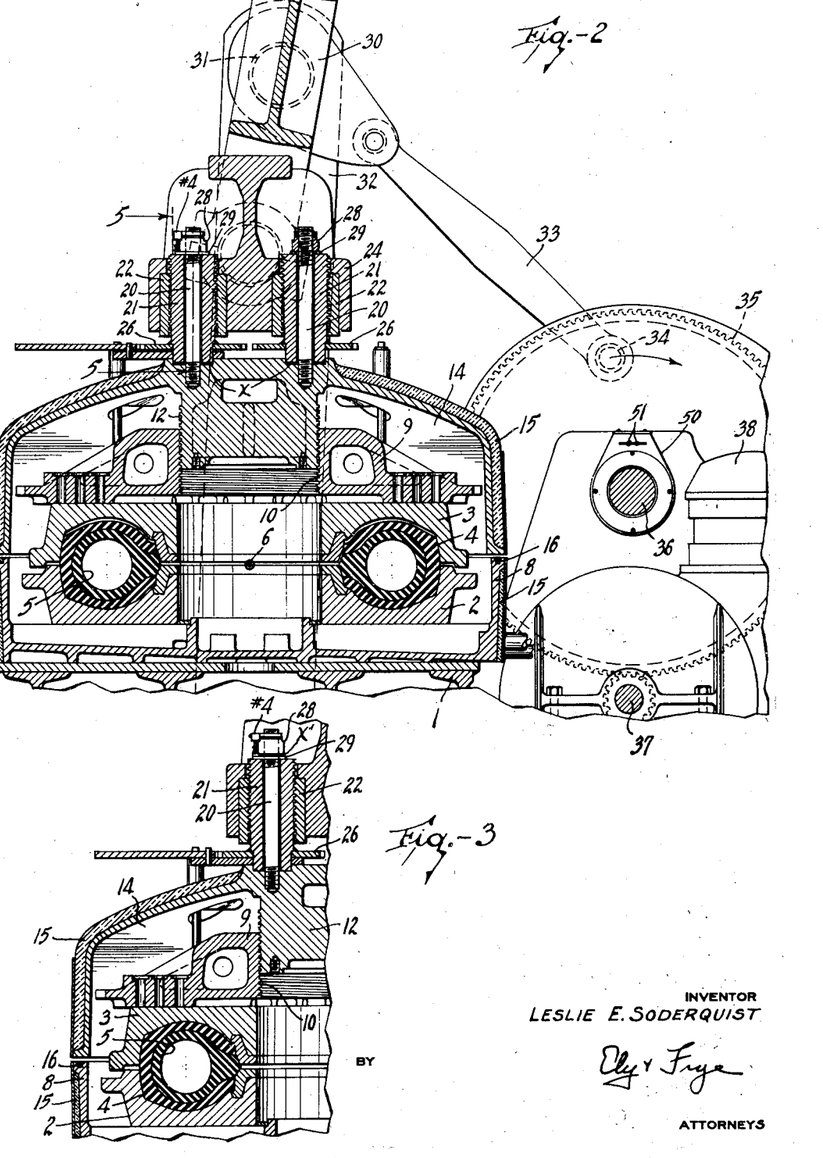
Fig. 2 is a similar view of the press showing the press as it starts to open when conditions are normal, i. e., when the fluid pressure has been relieved in the air bag before the press starts to open.
Fig. 3 is a fragmentary view showing the condition of the press and tire when the press has started to open and has been arrested by the reaction of the device from the excessive and dangerous residual pressure within the air bag.

Referring particularly to Figs. 4 to 7 inclusive:

The safety switch #4 is mounted on one of the nuts 28, being secured to one of the flattened sides thereof. This nut is formed with a slot 61 and with a set screw 62 which act as a locking means to hold the nut firmly and securely at its adjusted position. The switch #4 is provided with an operating pin #4ᵃ which, when the parts are in the position shown in Fig. 4 with the space at $x'$, touches the head of an adjustable operating set screw 64 carried by the washer 29, the washer and nut being formed with mating dowels 65 so that the pin #4ᵃ and the set screw 62 will always be in register. In the position shown in Fig. 4, the switch #4 is lowered as shown in Fig. 10, so that if the pin #4ᵃ is not raised when the switch #2 is lowered by passing off the cam 56, the circuit through the magnet 47 is broken at #4. If, however, the pressure is relieved in the air bag to the extent sufficient to permit the mold half 3 to drop as shown in Fig. 2, so that the gap $x'$ is closed, the pin #4ᵃ is raised, raising the switch #4, and the circuit to the magnet is now completed through the switches #2 and #4.

It will be seen that when the switch #4 is lowered, a shunt circuit 48ᵃ is closed, which includes a lamp 70 which is conveniently colored red and acts as an alarm. After the press starts to open and operations are normal, the movement of the switch #4 will shut off the current from the circuit 48ᵃ, but if the light stays on, the operator is warned that the conditions are dangerous. Also, around the timer motor is located a second light 71, usually green, which glows during the operation of the timer motor.

It is believed that the operation of the safety mechanism will have been made clear by the foregoing and that an extensive résumé of the mechanism is not necessary. The mechanism is distinctive from the prior art devices as it is directly responsive to the pressure in the air bag which is utilized to move one section of the mold from the position which it would assume under normal conditions, and this movement of the mold section is transferred to a safety switch which acts to stop the press-operating motor. While it is similar to the device shown in my prior Patent No. 2,242,795 in that the residual pressure acts upon a mold section directly to actuate the safety, the present invention utilizes a mold which is shiftable with respect to its supporting means to achieve the result.

It is conceivable that many different schemes may be devised to adapt this basic principle, and so far as known to me the present mechanism is the first to provide for a degree of lost motion between the mold and its supporting means and to employ this lost motion for the operation of a safety device which will arrest the opening movement of the press before any disastrous results can occur due to the presence of dangerous residual pressure in the article within the mold. I, therefore, deem myself to cover by the appended claims all modifications of the broad principle for the uses and purposes set forth.

What is claimed is:

1. In combination with a separable mold for treating articles while under internal fluid pressure, comprising two sections, a support for one of said sections, means for securing the said mold section to its support so as to permit a limited shifting of the last mentioned mold section on its support while the mold sections are being separated, power means to separate said sections at the end of the treatment, and means actuated by residual pressure within the article acting upon the shifting mold section to shift the latter upon its support to render said power means inactive.

2. In combination with a separable mold for treating articles while under internal fluid pressure, comprising two sections, a support for one of said sections, means for securing the said mold section to its support so as to permit a limited shifting of the last mentioned mold section on its support while the mold sections are being separated, power means to separate said sections at the end of the treatment, and means actuated by residual pressure within the article acting upon the shifting mold section to shift the latter upon its support to render said power means inactive after the mold has been partially opened.

3. In a press for the vulcanization of expansible articles while under internal pressure, comprising complementary mold sections, a support for one of said mold sections, means for mounting said last named mold section so as to permit a limited shifting thereof relative to its support, means to open the press at the completion of vulcanization, and means operable by shifting movement of the shiftable mold section actuated by pressure remaining within the mold after the sections have been partially separated to arrest the operation of the opening means.

4. In a press for the vulcanization of pneumatic tires while under internal pressure exerted through a curing bag, two mold sections, a motor to move a mold section to open the press at the end of the curing operation, a support, said last mentioned mold section being so mounted on the support as to permit limited movement thereon by pressure within the bag, and means actuated by the movement of said last mentioned mold section with respect to its support to disconnect the motor in the presence of pressure within the bag after the mold sections have been partially separated by the motor.

5. In a press for the vulcanization of pneumatic tires while under internal pressure within an air bag, two mold sections, a support for one of said mold sections, said last-mentioned mold section being mounted so that a limited motion is permissible upon said support, a motor for separating the mold sections at the completion of the vulcanizing operation, and a switch in the path of the last mentioned mold section and actuated by motion of the latter upon said support to stop the motor in the presence of residual pressure in the air bag after the two mold sections are partially separated.

6. In a press for vulcanizing pneumatic tires while under internal pressure, a pair of mold sections, a support for one of said mold sections, means for mounting said last mentioned mold section so as to permit limited movement thereof on its support, a motor for moving the last mentioned mold section to open the press at the end of the vulcanizing period, two circuits for controlling the operation of the motor, one of said circuits controlling the partial opening of the press and the second circuit controlling the remainder of the opening movement, and means actuated by the movement of the last mentioned mold section on its support for holding the second circuit open in the presence of residual pressure within the tire.

7. In a press for vulcanizing pneumatic tires while under internal pressure, a movable mold section, a support for the mold section, means for mounting said mold section so as to permit limited movement thereof on its support, a motor for moving the mold section at the end of the vulcanizing period to open the press, two circuits for controlling the operation of the motor, one of said circuits permitting the partial opening of the press and the second circuit controlling the remainder of the opening movement, and means actuated by the movement of the mold section on its support for holding the second circuit open in the presence of residual pressure within the tire.

8. In a press for vulcanizing pneumatic tires while under internal pressure, a crosshead, a separable mold comprising a mold section attached to the crosshead, means for mounting the mold section so as to permit a limited movement thereof on the crosshead, power means to move the crosshead to move the mold section at the end of the vulcanizing period, and an electrical switch actuated by the said limited movement of the mold on the crosshead, said switch being movable to disconnect the power means in the presence of residual pressure in the tire.

9. In a press for vulcanizing pneumatic tires while under internal pressure, a crosshead, a separable mold comprising a mold section attached to the crosshead, means for mounting the mold section so as to permit a limited movement thereof on the crosshead, power means to move the crosshead to move the mold section at the end of the vulcanizing period, and an electrical switch actuated by the said limited movement of the mold on the crosshead, said switch being movable after the mold has partially opened to disconnect the power means in the presence of residual pressure in the tire.

10. In a press for vulcanizing articles while under internal pressure, a crosshead, a mold section, means for suspending the mold section from the crosshead so as to permit a limited vertical movement of the mold section thereon, a motor for raising the crosshead, an electrical circuit for controlling the operation of the motor, and a switch in said circuit, said switch being opened to break the circuit in the event the mold section is moved vertically on its support by residual pressure within the article.

11. In a press for vulcanizing articles while under internal pressure, a crosshead, a mold section, means for suspending the mold section from the crosshead so as to permit a limited vertical movement of the mold section thereon, a motor for raising the crosshead, an electrical circuit for controlling the operation of the motor until the mold section is partially raised, a second circuit for controlling the operation of the motor during the remainder of the raising movement, and a switch in the second circuit responsive to movement of the mold section on the crosshead caused by residual pressure in the article to break the second circuit.

12. In a press for vulcanizing articles while under internal pressure, a crosshead, a mold section, means for suspending the mold section from the crosshead so as to permit a limited vertical movement of the mold section thereon, a motor for raising the crosshead, an electrical circuit for controlling the operation of the motor until the mold section is partially raised, a second circuit for controlling the operation of the motor during the remainder of the raising movement, a switch in the second circuit, which switch is normally closed when the mold section is supported by the crosshead, and means to open the switch when the mold section is supported by pressure within the article.

13. In a press for vulcanizing articles while under internal pressure, a crosshead, a separable mold comprising a mold section, means for supporting the mold section on the crosshead with provision for limited relative movement between the section and the crosshead, said mold section being shiftable on the crosshead by pressure in the article, power means for opening the mold, and means responsive to the movement of the mold section on the crosshead for rendering said power means inoperative in the event pressure is present in the article after the mold is partially opened.

14. In a press for vulcanizing articles while under internal pressure, a crosshead, a separable mold comprising a mold section, means for suspending the mold section from the crosshead with provision for limited relative movement between the section and the crosshead, said mold section being supportable by pressure in the article, power means to open the mold, means to actuate said power means to open the mold partially at the end of the vulcanizing period, and a secondary means to control the power means during the completion of the opening movement, said secondary means being responsive to the movement of the mold section on the crosshead.

15. In a press for vulcanizing articles while under internal pressure, a crosshead, a separable mold comprising a mold section, means for suspending the mold section from the crosshead with provision for limited relative movement between the section and the crosshead, said mold section being supportable by pressure in the article, power means to open the mold, means to actuate said power means to open the mold partially at the end of the vulcanizing period, and a secondary means to control the power means during the completion of the opening movement, said secondary means including an electrical circuit and a switch in said circuit, said switch being operable to break the circuit in the event any pressure remaining in the article after the mold is partially opened is sufficient to support the mold section.

16. In a press for vulcanizing articles while under internal pressure, a separable mold comprising a mold section, means for suspending the mold section in the press with provision for a relative limited movement of said mold section on said means, said mold section being supportable by pressure in the article, power means to open the mold, a timing device to actuate the power means at the end of the vulcanizing period, and means to render said power means inoperative, said last named means being responsive to the degree of pressure remaining in the article after the beginning of the opening movement and controlled by the position of the mold section at one end of its limited movement.

17. In a press for vulcanizing tires, a separable mold comprising mold sections and steam boxes connected to the mold sections and providing a chamber surrounding the mold sections, means to suspend a steam box and its mold section within the press and providing for a limited, independent, vertical movement thereon of said steam box and mold section, a motor to open the press at the end of the vulcanizing period, an electrical circuit to control the operation of the motor, a switch in the circuit, and means controlled by the position of the said steam box and mold to open said switch after the press is partially opened in the event the pressure remaining within the steam box or the mold is sufficient to support the combined weight of the mold section and its attached steam box.

18. In combination with a pair of separable mold sections at least one of which is movable to open and close the mold, a support to which one of the mold sections is attached, said last named mold section and its support being capable of relative movement, power means to open the mold, and means controlled by the movement of said last named mold section on its support to disconnect the power means.

19. In combination with a pair of separable mold sections at least one of which is movable to open and close the mold, a support to which one of the mold sections is attached, said last named mold section and its support being capable of relative movement, power means to open the mold, and means controlled by the movement of said last named mold section on its support to disconnect the power means after the mold has been partially opened.

20. In combination with separable upper and lower mold sections at least the upper of which is movable to open and close the mold, a support to which said upper mold section is attached, said upper mold section and its support being capable of relative movement, power means to open the mold, and means controlled by the movement of said upper mold section on its support to disconnect the power means.

21. In combination with a separable mold for treating articles while under internal fluid pressure, comprising an upper and a lower mold section, a support for said upper mold section, means for securing the upper mold section to its support so as to permit a limited shifting of the mold section thereon, power means to separate said sections at the end of the treatment, and means actuated by residual pressure within the article acting upon the upper mold section to render said power means inactive.

22. In a vulcanizing press of the character described, in combination, a pair of separable steam boxes adapted to enclose a pair of mold sections, at least one of which steam boxes is movable to open and close the press, a support to which one of said steam boxes is attached, said last named steam box and its support being capable of relative movement, power means to separate the steam boxes, and means controlled by the movement of said movable steam box on its support to disconnect the power means.

23. In a vulcanizing press of the character described, in combination, upper and lower separable steam boxes adapted to enclose a pair of mold sections, at least the upper of which steam boxes is movable to open and close the press, a support to which said upper steam box is attached, said upper steam box and its support being capable of relative movement, power means to separate the steam boxes, and means controlled by the movement of said upper steam box on its support to disconnect the power means.

24. In a vulcanizing press of the character described, in combination, a crosshead, a pair of separable steam boxes, means for suspending one of said steam boxes from said crosshead so as to permit a limited vertical movement of the last mentioned steam box thereon, means to move the crosshead to move the last mentioned steam box at the end of the vulcanizing period, and means actuated by the said limited movement of the last mentioned steam box on the crosshead to render said first named means inoperative in the presence of substantial steam pressure in the steam boxes.

25. In a vulcanizing press of the character described, in combination, a crosshead, a pair of separable steam boxes, means for suspending one of said steam boxes from said crosshead so as to permit a limited vertical movement of the last mentioned steam box thereon, power means to move the crosshead to move said last mentioned steam box at the end of the vulcanizing period, and an electrical switch actuated by the said limited movement of said last mentioned steam box on the crosshead, said switch being movable after said steam boxes have been partially separated to disconnect the power means in the presence of substantial steam pressure in the steam boxes.

LESLIE E. SODERQUIST.